United States Patent Office 3,389,119
Patented June 18, 1968

3,389,119
POLYETHYLENE COMPOSITIONS STABILIZED
WITH A TERTIARY AMINE AND A PHENOL
Robert Worth Sherrill, Orange, Tex., assignor to E. I. du
Pont de Nemours and Company, Wilmington, Del., a
corporation of Delaware
No Drawing. Filed Mar. 15, 1965, Ser. No. 439,939
1 Claim. (Cl. 260—45.9)

ABSTRACT OF THE DISCLOSURE

The melt stability of olefin polymers, e.g. polyethylene, is improved by the addition of from 0.01 to 2.0 percent by weight based upon the polyethylene of a combination of an amine, e.g. octadecyl diethanol amine and a substituted phenol, e.g. 4,4'-butylidene - bis - (6-t-butyl-m-cresol).

---

The present invention relates to a thermoplastic composition, and, more particularly, to a thermoplastic having incorporated therein a combination of a phenolic antioxidant and an amine to enhance the thermal stability of the polymer.

The prior art has appreciated the need for thermal stabilization of various thermoplastic polymers and has suggested several antioxidants to decrease the degradation of the polymer during molding and in end use.

The present invention is realized by providing a thermoplastic composition wherein the thermoplastic contains from 0.01 to 10 percent, and preferably from 0.01 to 2 percent of a combination of a substituted phenol and a substituted amine. This combination of additives provides a thermoplastic which exhibits a higher thermal stability than a thermoplastic containing either additive alone at the same total concentration.

More specifically, the amines which are operable in the present invention are the ethoxylated amines, e.g., diethanol amine, and may be described by the following formulae:

and

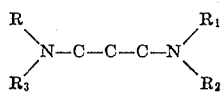

wherein R is an alkyl group having 8 to 18 carbon atoms and $R_1$, $R_2$ and $R_3$ are selected from the class consisting of hydrogen and hydroxyoxyalkylene groups, wherein the total carbon atoms in $R_1+R_2+R_3$ is from 2 to 10.

The phenolic antioxidants may be specifically described as substituted phenols having the formula

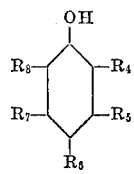

wherein $R_4$, $R_5$, $R_6$, $R_7$ and $R_8$ are selected from the class consisting of hydrogen and at least one, and preferably three of the aforesaid R groups are alkyl groups having 1 to 18 carbon atoms, alkoxy groups having 1 to 2 carbon atoms, aryl sulfides having 6 to 14 carbon atoms, alkylidene phenols having 7 to 10 carbon atoms, alkylidene substituted phenols having 8 to 40 carbon atoms and substituted alkylidene substituted phenols having 9 to 32 carbon atoms. The relatively proportions of the additives should be such that approximately one part by weight of the aforementioned phenol is present for 2 to 60, and preferably 4 to 25 parts by weight of the aforementioned amine.

Illustrative of the amines which are operable in the present invention are octyldiethanol amine, tridecyl diethanol amine, octadecyl diethanol amine, N,N,N'-triethanol-N'-octadecyl-trimethylene diamine.

Illustrative of the substituted phenols which are operable in the present invention are 2,6-di-t-butyl-p-cresol,
1-methoxy-3,5-di-t-butyl-4-hydroxy benzene,
2,4,6-tri(3,5-di-t-butyl-4-hydroxy benzyl) mestiylene,
1,1,4-tri(2-methyl-4-hydroxy-5-t-butyl benzene) butane,
2,2'-methylene-bis[4-methyl-6-(1-methylcyclohexyl)]
  phenol,
4,4'-butylidene-bis-(6-t-butyl-m-cresol),
di-lauryl-thio-dipropionate,
4,4'-thio-bis-(6-t-butyl-m-cresol),
2,6-bis-(1-methyl-heptadecyl)-p-cresol,
di(4-hydroxy phenyl) methane,
1,1-di-(2,5-t-butyl, 4-hydroxy benzene)-4-(2-methyl,
  4-hydroxy-5-t-butyl benzene) butane,
phenoxy phenyl sulfide,
4-hydroxy phenyl-(2,6-di-t-butyl, 4-hydroxy phenyl)
  sulfide,
2,6-di-t-butyl phenol,
4,4'-methylene-bis-(2,6-di-t-butyl phenol),
2,6-di-t-butyl hydroquinone,
4-octadecyl phenol,
2,4,6-tri-(octadecyl) phenol,
2,4-di-(octadecyl) phenol,
2,4,6-tri-(methyl) phenol,
2,4-di-(methyl) phenol,
1-ethoxy-3,5-di-(t-butyl-4-hydroxy) benzene, and
1-(2-methyl-4-hydroxy phenyl) ethane.

The beneficial effect of the combination of additives of the present invention may be noted by comparing the melt stability of the polymer before and after introduction of the additives singly and in combination. The melt stability or the melt index stability (M.I.S.) is determined as follows. The melt index of the resin is determined according to ASTM D–1238–57T at 190° C. A portion of the untested resin is maintained in the barrel of the melt index apparatus under substantially no pressure at 250° C. or at 300° C. for five minutes. This sample is then cooled to 190° C. and its melt index determined. The ratio of the melt index of the resin after retention at 250° C. or 300° C. to the melt index according to the standard test is recorded as melt index stability (M.I.S.).

The following examples are presented to illustrate and not to restrict the present invention. Parts and percentages are by weight unless otherwise noted.

Example 1

Approximately 450 grams of polyethylene having a melt index of 0.2 and a density of 0.950 gram/cc. at 25° C. in the form of molding granules were contacted with a standard type of differential two-roll mill with the roll temperature of about 160° C. until a molten band of polymer was obtained. The stabilizers indicated in Table I were added to the molten resin and milling was continued for an additional five minutes to insure homogeneous mixing following which the molten polymer was removed from the rolls with a standard type of scraping knife and permitted to cool in air at room temperature. The solidified resin was then reduced to granules of a size suitable for introduction into a melt indexer, and the melt index stability of the resin was determined as described hereinabove and is reported in Table I. The above-described procedure was repeated for each additive at the concentrations specified and for the combination of additives of the present invention. The synergistic effects of the phenolic antioxidant and the amine stabilizers are readily apparent from Table I which shows that the combination of additives consistently produced a resin having a higher melt index stability compared to a resin having either additive alone at an equivalent total concentration.

moplastic materials in the preparation of bottles, film, filaments, rods and tubes, etc.

What is claimed is:

1. A thermally stable composition consisting essentially of polyethylene having from 0.01 to 2.0 percent by weight based upon said polyethylene of 4 to 25 parts by weight of octadecyl diethanol amine and one part by weight of 4,4'-butylidene-bis-(6-t-butyl-m-cresol), said composition being characterized by a higher melt index stability com-

TABLE I

| Blend | Additives | | Melt Index Stability | |
|---|---|---|---|---|
| | Type | Total Concentration, parts/million | At 250° C. | At 300° C. |
| 1 | 1,1,4-tri(2-methyl-4-hydroxy-5-t-butyl benzene) butane | 1,000 | 0.54 | 0.66 |
| | | 1,500 | 0.53 | 0.59 |
| 2 | Tridecyl diethanol amine | 1,000 | 0.85 | 0.64 |
| | | 1,500 | 0.87 | 0.55 |
| 3 | 2,4,6-tri-(3,5-di-t-butyl-4-hydroxybenzyl) mesitylene | 1,000 | 0.86 | 0.68 |
| | | 1,500 | 0.83 | 0.73 |
| 4 | N,N,N,'-triethanol-N'-octadecyltrimethylenediamine | 1,000 | 0.82 | |
| | | 1,500 | 0.96 | |
| | | 2,000 | 0.96 | |
| 5 | 4,4'-butylidene-bis-(6-t-butyl-m-cresol) | 1,000 | 0.59 | 0.64 |
| 6 | Octadecyl diethanol amine | 1,000 | 0.95 | 0.59 |
| | | 1,500 | 1.04 | 0.71 |
| 7 | Stabilizer employed in Blend 1 at 250 p.p.m. / Stabilizer employed in Blend 2 at 1,000 p.p.m. | 1,250 | 0.91 | 0.77 |
| 8 | Stabilizer employed in Blend 1 at 500 p.p.m. / Stabilizer employed in Blend 2 at 1,000 p.p.m. | 1,500 | 0.95 | 0.81 |
| 9 | Stabilizer employed in Blend 3 at 250 p.p.m. / Stabilizer employed in Blend 2 at 1,000 p.p.m. | 1,250 | 0.97 | 0.70 |
| 10 | Stabilizer employed in Blend 3 at 500 p.p.m. / Stabilizer employed in Blend 2 at 1,000 p.p.m. | 1,500 | 0.93 | 0.75 |
| 11 | Stabilizer employed in Blend 5 at 250 p.p.m. / Stabilizer employed in Blend 2 at 1,000 p.p.m. | 1,250 | 0.91 | 0.95 |
| 12 | Stabilizer employed in Blend 3 at 250 p.p.m. / Stabilizer employed in Blend 4 at 1,500 p.p.m. | 1,750 | 1.1 | |
| 13 | Stabilizer employed in Blend 1 at 250 p.p.m. / Stabilizer employed in Blend 4 at 1,500 p.p.m. | 1,750 | 1.08 | |
| 14 | Stabilizer employed in Blend 5 at 250 p.p.m. / Stabilizer employed in Blend 6 at 1,000 p.p.m. | 1,250 | 0.91 | 0.95 |

Thermoplastics which are operable in the present invention include polyolefins such as polyethylene, olefin copolymers such as polypropylene, ethylene/α-olefin copolymers, propylene block copolymers, ethylene/polar comonomer copolymers, polybutene and similar polyolefins.

The preferred combination of stabilizers in the present invention is octadecyl diethanolamine, 4,4'-butylidene-bis-(6-t-butyl-m-cresol) at a total concentration of from 0.1 to 0.3 percent and in the relative proportion of 1 part by weight of the phenol to 2 to 60 parts by weight of amine.

The compositions of the present invention find widespread use in the extrusion and injection molding of therpared to a composition without said amine and said cresol or with said amine or said cresol alone at equivalent total concentration.

References Cited

UNITED STATES PATENTS

| 3,092,609 | 6/1963 | Kostelitz et al. | 260—45.9 |
| 3,181,971 | 5/1965 | Rayner | 260—45.9 |
| 3,243,407 | 3/1966 | Lee | 260—45.9 |
| 3,288,748 | 11/1966 | Cyba | 260—45.9 |

DONALD E. CZAJA, *Primary Examiner.*

H. E. TAYLOR, *Examiner.*